Oct. 28, 1958 H. I. SILVERSHER 2,858,451
LAMINAR RAY SHIELDING MATERIALS
Filed March 7, 1955

HERMAN I. SILVERSHER,
INVENTOR.

BY

ATTORNEY.

United States Patent Office 2,858,451
Patented Oct. 28, 1958

2,858,451

LAMINAR RAY SHIELDING MATERIALS

Herman I. Silversher, Los Angeles, Calif.

Application March 7, 1955, Serial No. 492,486

9 Claims. (Cl. 250—108)

This invention has to do generally with improved composite or laminated materials for use in shielding against transmission of various highly penetrating rays ranging from X-rays to the ray emission of fissionable materials, and to new methods for the manufacture of such laminates.

The invention is predicated upon the general concept of preventing or minimizing the transmission of such rays by the placement of one or more blocking or absorptive resistances in their paths, together with the use of one or more other resistances the tendency of which is to deflect or reflect the rays. In a physical and structural sense, the invention contemplates incorporating such ray blocking and deflecting materials in a single unitized or integrated composite in laminated form presenting the ray effecting materials in such proximate and relative positions as will most effectively prevent or minimize ray transmission through the composite. More specifically, the invention has for its object incorporation in a unitized thermally bonded laminar form and composition, and the method of bonding and integrating its several sheet components, whereby in a single heating and molding or deforming step, the various layers may be bonded by the curing of a thermo setting resin and the composite may be formed or bent into any of various shapes. For some purposes, as in the making of panels for obstructing ray emanation from or into rooms, compartments, chambers, or instrument housings, the laminated composite may be given planar or sheet form, whereas for other purposes as in the shaping of curved wall compartments, housings, shields such as helmets, and the like, the laminations may be deformed in suitable heated shaping or molding equipment at the same time the laminations are being heated and bonded together by curing of the thermo setting resin between them.

By reason of their relatively great density, certain metals of the group consisting of lead, uranium, thorium and thallium have a capacity to block ray transmission to a considerable extent by virtue of absorption of the rays. For purposes of further description, lead may be regarded as typical and preferred because of its availability and cost advantages of metals in this class. The completeness of ray blocking by any of these metals, will be dependent upon the nature and concentration of the rays, as well as the total thickness of the metal barrier in any particular instance. It will be understood that for the purposes of the invention, I may use one or more sheets of any of these metals, or combinations thereof, and which may range in thickness from about 3/1000 inch to 6 inches. Blocking of the rays by these heavier metals occurs at least partially by absorption in them of some of the ray energy, and gives rise to another phenomena in the nature of a secondary radiation of absorbed energy from the metal. As will appear, in dealing with the problem of preventing or limiting ray transmission, the invention also aims to reduce and minimize the secondary radiation effects.

The present composite material also employs the use of one or more sheets whose thicknesses may fall in about the same range of the thicknesses of the heavy metal, of one or more of such metals as copper, aluminum, brass, lithium, and ductile ferrous metals, whose effect upon the rays striking them is more in the nature of deflection or reflection, as distinguished from blocking by absorption and relatively low reflection. Aluminum may be regarded as illustrative of the metals in this second group. Thus in a composite employing for example lead and aluminum sheets, the aluminum serves to reduce by deflection or reflection of the rays, the ray energy and concentration to which the lead is subjected, and the aluminum serves further to reduce secondary ray emanations from the lead. The aluminum has a comparatively short half-life, i. e. the time during which it will continue to emanate previously absorbed rays.

It is preferred to further increase the ray blocking capacity of the composite and prevent or minimize neutron transmission by including therein one or more sheets of a polymerized resin or plastic material, which generally speaking may be selected from any of the so-called plastics capable of conforming to such deformation as the composite is to be given in any particular molding or shaping operation. Typically, the preformed plastic sheet or sheets, in thicknesses within the metal sheet thickness range, may be selected from such resins as polyethylene, fluorinated ethylenes, polystyrene and polybutene. Thus when so composed, all the laminations, metal and resin, have such ductility as will permit them to be shaped and deformed as desired.

The laminations are bonded together by the use of any suitable thermo setting resin which will cure at the temperature, which may range for example from about 100° F. to 350° F., at which the laminations are pressed together for integration and such shaping or deformation as may be required. Suitable bonding agents are the so-called B-stage (incompletely polymerized) resins of the additional type including the styrene base polyesters, epoxy resins and silicone resins, rubbers, and phenol formaldehyde resins. Among these the epoxy resins are often preferred because of such qualities as superior adhesiveness, flexibility and dimensional stability. The epoxide resins have the general formula:

$$H_2C\overset{O}{-}CH-CH_2(O-R-O-CH_2-CHOH-CH_2)_n O-R-O-CH_2-\overset{O}{CH-CH}$$

wherein "R" represents the divalent radical of dihydric phenol and "n" is from 0 to 4. One major difference between various resins having this generic formula is in the (n) value which determines the length of the molecule. The more fluid the resin the smaller the (n) value. Generally these epoxy resins having a value for (n) of 2 or more are solid or essentially solid and may require solvent thinning for their use, whereas those having an (n) value of 0 or 1 are essentially stable fluids. It is these latter fluid epoxy resins which I prefer to use for the purposes of the present invention by reason of the facility possessed by the fluid resin for wetting the lead or lead silicate particles, and the resultant capacity of the resin to permit incorporation therewith of higher amounts of the lead or lead silicate in dense and uniform distribution. Accordingly, the preferred epoxy resins are those which are normally fluid, having an (n) value of from 0 to 1, and an epoxide equivalent between 140 and 550, the epoxide equivalent being defined as the grams of resin containing 1 gram equivalent of the epoxide group—

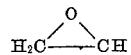

The epoxide resin is cured by cross linkage or additional polymerization with any of various compounds having amino or amide groups. Among the various amino or amide materials useable for the curing of epoxy resins are 2,4,6-tri(dimethylaminomethyl) phenol, diethylenetriamine, dimethyl amino propylamine, meta phenylene diamine, dicyandiamide, piperidine, and pyridine.

For certain purposes it may be desirable to favor the resiliency and toughness of the composite material by incorporating therein a plasticizer, for which purpose the polyamide resins have been found to be particularly satisfactory. These are resins having molecular weights ranging from 3,000 to 10,000, and are prepared by the condensation of polymerized unsaturated fatty acid (e. g. dilinoleic acid) with aliphatic amines such as ethylene diamine. Structurally, such polyamide resins have the formula $HO(-C-R-C-NH-CH_2-CH_2-NH)_nH$, wherein "n" may range from 5 to 15. Typical of such resins is "Polyamide Resin 115" as sold by General Mills, Inc. In the case of the amino reaction, if the amine molecule contains more than one amino group, two or more epoxide units may be coupled together.

Relative to the curing effects and reactions of the amino group materials with relation to the epoxy resin, if the amine molecule contains more than one amino group, two or more epoxide units may be coupled together. The optimum amount of curing will occur when the epoxide and amino groups react, without any of either being left in excess after the reaction is completed. Thus the proper amount of any amino or amide group material to be used in the curing of the epoxy resin may be determined on a stoichiometric basis. In general the amide or amino group additive will range between from $\frac{1}{20}$ to $\frac{1}{2}$ weight parts to 1 part of the epoxy resin.

Where desired for additional strength and possible shear resistance in the bonding resin, the latter may be reinforced with such inert materials as glass or glass fibers or fabrics.

The invention contemplates further the incorporation of any of the aforementioned metals, heavy salts (e. g. lead monosilicate) and oxides thereof, or mixtures thereof, in any of the resinous components of the composite material. Thus the bonding agent, e. g. epoxy resin, may be admixed with up to around 15 weight parts of any of these metals, e. g. lead or aluminum, in powdered form, to improve the ray blocking or deflecting qualities of the resin as such. Also the preformed sheet plastic material, e. g. polyethylene, may be composed of the resin containing uniformly distributed therein any of the powdered metals in whatever concentration desired so long as they are adequately integrated by the resin.

The invention will be further understood by reference to the accompanying drawing wherein I have shown certain typical and illustrative combinations of the sheet materials in interbonded laminar form. In the drawing.

Figure 1:
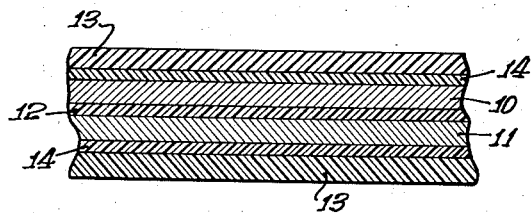
Fig. 1 is a fragmentary section taken through a laminated composite containing two dissimilar metal sheets bonded together in direct relation.

In Fig. 1 the composite material is shown to include a sheet 10 of relatively dense metal, such as lead, bonded to a sheet 11 of a deflective metal such as aluminum which in use, may be positioned between sheet 10 and the ray source. The two metal sheets are bonded together by a layer or common coating of a thermo setting bonding plastic 12, such as the epoxy resin which polymerizes as the composite assembly is heated and subjected to whatever pressure desired to urge the sheets together. Ordinarily it is preferred to include also a preformed plastic sheet 13, such as polyetheylene, which may surface the composite at one or both sides of the metal sheets 10 and 11. The plastic sheet is bonded thereto at 14 using the same resin employed for bonding the metal sheets together or by mechanical attachment.

Figure 2:
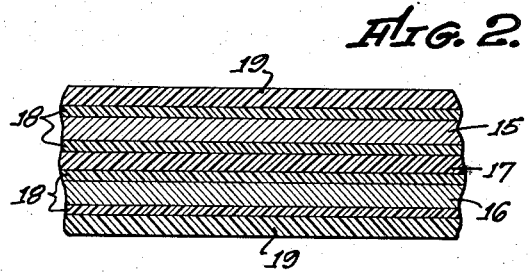
Fig. 2 is a similar view showing the metal sheets indirectly bonded together by way of an intermediate resin sheet.

In Fig. 2 the lead 15 and aluminum 16 sheets are shown to be indirectly bonded to an inner positioned plastic sheet 17 by the bonding resin indicated at 18. As before, one or both metal sheets may be covered at the outside by plastic sheets 19.

Figure 3:
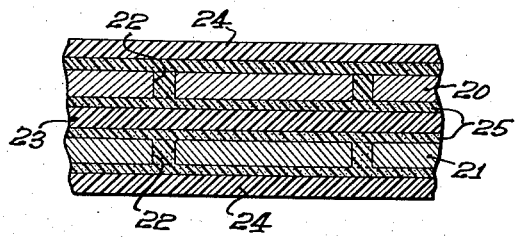
Fig. 3 is another view showing the metal sheets to be apertured where desirable for effecting stronger bonds.

Fig. 3 shows the metal sheets 20 and 21 to contain recesses or holes 22 wherever desirable to form a stronger bond, as with the plastic sheets 23 and 24. Here the bonding resin 25 may contain any of the metals, for example lead or aluminum, in powdered form, uniformly dispersed throughout the resin, for the purpose of minimizing ray transmission through the recesses or openings.

To cite a specific example of the invention in reference to Fig. 2, lead sheet 15, aluminum sheet 16 and plastic sheets 19 each may be around $\frac{1}{8}$ inch in thickness, and are bonded together by polymerization of about 100 parts of an epoxy resin (e. g. Shell "Epon 828") and about 15 parts of meta phenylene diamine. The laminations are placed together as illustrated in a heated press or mold, and the resin cured at a temperature of about 280° F. A post cure at 350° F. will give optimum physical and structural properties.

I claim:

1. A laminated ray shielding material comprising a first sheet of a ray-blocking metal of the group consisting of lead, uranium, thorium and thallium, bonded to a second sheet of ray-reflective metal of the group consisting of copper, aluminum, brass and ductile ferrous metals, a third resinous sheet bonded to said first and second sheets, and a thermosetting resin between the sheets and bonding them together.

2. A laminated ray shielding material comprising a first sheet of a ray-blocking metal of the group consisting of lead, uranium, thorium and thallium, bonded to a second sheet of ray-reflective metal of the group consisting of copper, aluminum, brass and ductile ferrous metals, a third resinous sheet positioned between and bonded to said first and second sheets, and a thermosetting resin between the sheets and bonding them together.

3. A laminated ray shielding material comprising a first sheet of a ray-blocking metal of the group consisting of lead, uranium, thorium and thallium, bonded to a second sheet of ray-reflective metal of the group consisting of copper, aluminum, brass and ductile ferrous metals, and a thermosetting resin between the sheets and bonding them together, said resin being admixed with a powdered one of said metals.

4. A laminated ray shielding material comprising a first sheet of a ray-blocking metal of the group consisting of lead, uranium, thorium and thallium, bonded to a second sheet of ray-reflective metal of the group consisting of copper, aluminum, brass and ductile ferrous metals, a third resinous sheet positioned between and bonded to said first and second sheets, and a thermosetting resin between the sheets and bonding them together, said resin being admixed with a powdered one of said metals.

5. A laminated ray shielding material comprising a first sheet of a ray-blocking metal of the group consisting of lead, uranium, thorium and thallium, bonded to a second sheet of ray-reflective metal of the group consisting of copper, aluminum, brass and ductile ferrous metals, an inner resinous sheet positioned between and bonded to said first and second sheet, and outside resinous sheet bonded to one of said first and second sheets, and a thermosetting resin between the sheets and bonding them together.

6. A material as defined in claim 1, in which said third sheet is polyethylene plastic.

7. A material as defined in claim 2, in which said third sheet is polyethylene plastic.

8. A material as defined by claim 1, in which one of said metal sheets contains openings filled with said resin.

9. A material as defined by claim 3 in which said sheets contain openings filled with said resin and powdered metal admixture.

References Cited in the file of this patent

UNITED STATES PATENTS

| | | |
|---|---|---|
| 1,854,942 | Lapof | Apr. 19, 1932 |
| 2,136,180 | Cooke | Nov. 8, 1938 |
| 2,354,081 | Weder | July 18, 1944 |
| 2,366,168 | Bakarian | Jan. 2, 1945 |
| 2,499,134 | De Bruyne | Feb. 28, 1950 |
| 2,679,468 | Pitman | May 25, 1954 |
| 2,682,515 | Naps | June 29, 1954 |